United States Patent
Palpacuer et al.

(10) Patent No.: US 11,351,813 B2
(45) Date of Patent: Jun. 7, 2022

(54) MOTOR VEHICLE WHEEL HAVING AN ALUMINUM RIM AND A STEEL WHEEL DISC JOINED TOGETHER BY WELDED PINS

(71) Applicants: PSA AUTOMOBILES S.A., Poissy (FR); MAGNETTO WHEELS FRANCE, Tergnier (FR)

(72) Inventors: Eric Palpacuer, Paris (FR); Romaric Lenoir, Le Port Marley (FR); David Feiner, Ermont (FR); Thomas Lety, Gif sur Yvette (FR)

(73) Assignees: PSA AUTOMOBILES SA, Poissy (FR); MAGNETTO WHEELS FRANCE, Tergnier (FR)

( * ) Notice: Subject to any disclaimer, the term of this patent is extended or adjusted under 35 U.S.C. 154(b) by 896 days.

(21) Appl. No.: 16/096,649

(22) PCT Filed: Mar. 22, 2017

(86) PCT No.: PCT/FR2017/050666
§ 371 (c)(1),
(2) Date: Oct. 25, 2018

(87) PCT Pub. No.: WO2017/187036
PCT Pub. Date: Nov. 2, 2017

(65) Prior Publication Data
US 2019/0134696 A1    May 9, 2019

(30) Foreign Application Priority Data

Apr. 25, 2016 (FR) ...................................... 1653617

(51) Int. Cl.
*B60B 3/04* (2006.01)
*B60B 23/08* (2006.01)
(Continued)

(52) U.S. Cl.
CPC .............. *B60B 3/041* (2013.01); *B21D 53/30* (2013.01); *B23K 20/1295* (2013.01); *B60B 23/08* (2013.01); *F16B 5/08* (2013.01)

(58) Field of Classification Search
CPC .... B21D 53/30; B21D 53/26; B23K 20/1295; B60B 3/04; B60B 3/041; B60B 3/042;
(Continued)

(56) References Cited

U.S. PATENT DOCUMENTS 1,956,963 A * 5/1934 Salmen, Jr. ......... F16B 23/0076
411/405
2,053,710 A * 9/1936 Gaenssle ................... B60B 3/04
301/35.59
(Continued)

FOREIGN PATENT DOCUMENTS

DE   102012014128 A1 * 3/2013   .......... F16B 23/0076
DE   102011118835 A1   5/2013
(Continued)

OTHER PUBLICATIONS

International Search Report for Corresponding PCT/FR2017/050666 dated Jul. 7, 2017.
(Continued)

*Primary Examiner* — Jason R Bellinger
(74) *Attorney, Agent, or Firm* — Sandberg Phoenix & von Gontard PC

(57) ABSTRACT

A wheel intended for a motor vehicle includes a rim made of a sheet of aluminium alloy that is fastened to the contour of a wheel disc made from a steel sheet by assemblies that connect the aluminium sheet of the rim and the steel sheet of the wheel disc, which overlap one another. The assemblies include connecting pins each of which has a tip that passes through a hole in the aluminium sheet of the rim, the front end of which is welded to the steel sheet of the wheel
(Continued)

disc, and a rear head that presses against the aluminium sheet of the rim about said hole.

10 Claims, 2 Drawing Sheets

(51) Int. Cl.
  *B21D 53/30* (2006.01)
  *B23K 20/12* (2006.01)
  *F16B 5/08* (2006.01)
(58) Field of Classification Search
  CPC ..... B60B 23/06; B60B 23/08; F16B 23/0076; F16B 41/005
  See application file for complete search history.

(56) References Cited

U.S. PATENT DOCUMENTS

| | | | | |
|---|---|---|---|---|
| 3,127,919 | A * | 4/1964 | Swanstrom | F16B 37/068 29/520 |
| 3,235,312 | A * | 2/1966 | Hollander | B60B 3/04 228/114.5 |
| 5,647,712 | A * | 7/1997 | Demirdogen | F16B 23/0076 411/404 |
| 10,221,946 | B1 * | 3/2019 | Pai | G05G 5/08 |
| 2003/0080608 | A1 * | 5/2003 | Coleman | B21D 53/26 301/63.103 |

FOREIGN PATENT DOCUMENTS

| | | | | |
|---|---|---|---|---|
| DE | 102018103995 A1 | * | 8/2019 | .......... F16B 23/0076 |
| EP | 1415737 B1 | | 5/2004 | |
| FR | 2994668 A1 | | 2/2014 | |
| GB | 1316954 A | | 5/1973 | |
| JP | 2000141066 A | * | 5/2000 | ............ B21J 15/027 |
| WO | WO-2008034563 A1 | * | 3/2008 | ........... B23K 20/127 |
| WO | 2014029665 A1 | | 2/2014 | |
| WO | 2015082790 A1 | | 6/2015 | |

OTHER PUBLICATIONS

Written Opinion for Corresponding PCT/FR2017/050666 dated Jul. 7, 2017.

* cited by examiner

MOTOR VEHICLE WHEEL HAVING AN ALUMINUM RIM AND A STEEL WHEEL DISC JOINED TOGETHER BY WELDED PINS

CROSS-REFERENCE TO RELATED APPLICATIONS

This application is the US National Stage under 35 U.S.C. § 371 of PCT/FR2017/050666 filed Mar. 22, 2017 and which claims priority to French App. No. 1653617 filed Apr. 25, 2016, both of which are incorporated herein by reference.

BACKGROUND

The present invention concerns a motor vehicle wheel having an aluminum rim and a steel disc. It also concerns a method for the manufacture of this wheel, as well as a vehicle fitted with such wheels.

A known type of wheel for a motor vehicle comprises a disc formed from a pressed steel sheet, receiving round its periphery a rim forming a circular profile of constant cross-section. The assembled wheel then undergoes a final treatment such as a protective covering and, lastly, receives on its rim a tire in order to form a complete wheel ready to be fitted on the vehicle.

In the case of a disc and a rim made of sheet steel, it is known to assemble these two elements by centering then by welding. This type of manufacture, using a widespread and well-established technology, enables the creation of a wheel of limited cost but of considerable weight, which must be reduced if the vehicle's fuel consumption and emissions of polluting gases are to be cut.

In the case of a wheel made of sheet aluminum alloy, henceforth called sheet aluminum, a disc and rim are manufactured, having equivalent shapes to those of the steel wheel, then assembled by a "MIG" (Metal Inert Gas) type weld. The sheet aluminum wheel weighs about 2 kg less than the sheet metal wheel.

However, this type of wheel made of aluminum sheets assembled by welding, has a relatively high cost price.

Another type of known wheel, described specifically in FR2994668A1, has a disc made of sheet steel and a rim of sheet aluminum, which are first assembled by interference fit to achieve positioning, then rigidly fixed together by a "MIG/CMT" (Cold Metal Transfer) type weld bead.

This weld creates a simultaneous fusion of an aluminum filler material with the aluminum base material, in order to wet the steel which is coated in zinc so as to guarantee the hold of the braze weld. In particular, the zinc coating can be obtained by electrolytic deposition or by hot-dip galvanizing.

A wheel weighing around 1.3 kg less than a wheel made entirely of sheet steel is obtained. However, braze-welding the aluminum rim onto the steel disc requires a preparation of these components that results in relatively high costs.

Another type of known wheel, described specifically in EP1415737B1, comprises an assembly of the sheet aluminum rim onto the sheet steel disc by means of a clinching system that connects these two superimposed sheets.

Clinching involves the application of a punch that descends into the two superimposed sheets deforming but not piercing them. A boss in the top sheet penetrates a hollow in the bottom sheet forming an undercut shape, so as to become wedged in this hollow to form an axial lock.

A mechanical assembly of the two pieces is obtained which, however, is tricky to achieve while ensuring a high level of guarantee for the wheels, which are safety components in the vehicle.

SUMMARY

The specific object of the present invention is to avoid the drawbacks of the prior art.

To this end, a wheel intended for a motor vehicle is provided, the wheel comprising a rim made of an aluminum alloy sheet, which is fixed to the perimeter of a disc made of a steel sheet by assemblies that connect the aluminum sheet of the rim to the steel sheet of the disc, which are superimposed, this wheel being remarkable in that the assemblies comprise connecting pins that have a tip that passes through a hole in the aluminum sheet of the rim, the front end of which is welded to the steel sheet of the disc, and a rear head that bears on the aluminum sheet around this hole.

One advantage of this wheel is that the connecting pins can be fitted simply and quickly in a single operation involving rotation of the pin while exerting pressure on the aluminum sheet, thereby enabling the tip to pierce the aluminum alloy, the friction of this tip on the steel sheet causing a heating and a welding of the tip on the sheet.

With the rear head of the pin bearing on a beading formed around the hole in the aluminum sheet by a displacement of material, a pin is obtained that efficiently clamps the aluminum sheet against the steel sheet.

In this way, a wheel is made that weighs considerably less than a wheel formed solely of steel sheets, at a slightly higher cost price.

The wheel can also have one or more of the following characteristics, which can be combined together.

Advantageously, the head of the pin defines indentations around its perimeter enabling the head, and thus the pins, to be driven in rotation.

In this case, the indentations are advantageously shaped so as to be rotatably driven by a tool in only one direction.

Advantageously, the end of the pin tips is domed.

Advantageously, the aluminum sheet forms a circular beading around the pin tip which protrudes above this sheet.

In this case, the pin head can have beneath it an annular hollow into which the circular beading fits.

In particular, the wheel can comprise assemblies each formed by a pair of pins positioned close together, these assemblies being distributed evenly around the contour of the wheel.

The aluminum sheet of the rim receiving the disc can form a cylindrical rim base having the smallest diameter of the rim.

Also disclosed is a method for manufacturing a wheel for a motor vehicle, the wheel comprising a rim made of an aluminum alloy sheet fixed round the contour of a disc made of a steel sheet by assemblies connecting the two superimposed sheets, this method comprising a cycle comprising different pressures and speeds of rotation of a steel pin, involving in a first step pressing of a front tip of this pin onto the aluminum sheet in order to pierce this sheet, in a subsequent step pressing of the front tip onto the steel sheet of the disc in order to cause a plastic deformation of this sheet adapting to the end shape of this tip, and in a subsequent step welding by friction of the tip of the pin onto the steel sheet of the disc.

Also disclosed is a motor vehicle comprising wheels having any one of the preceding characteristics.

DESCRIPTION OF THE FIGURES

Further features and advantages of the invention will emerge more clearly from the following description, given by way of example, with reference to the accompanying drawings in which.

DETAILED DESCRIPTION

Figure 1:
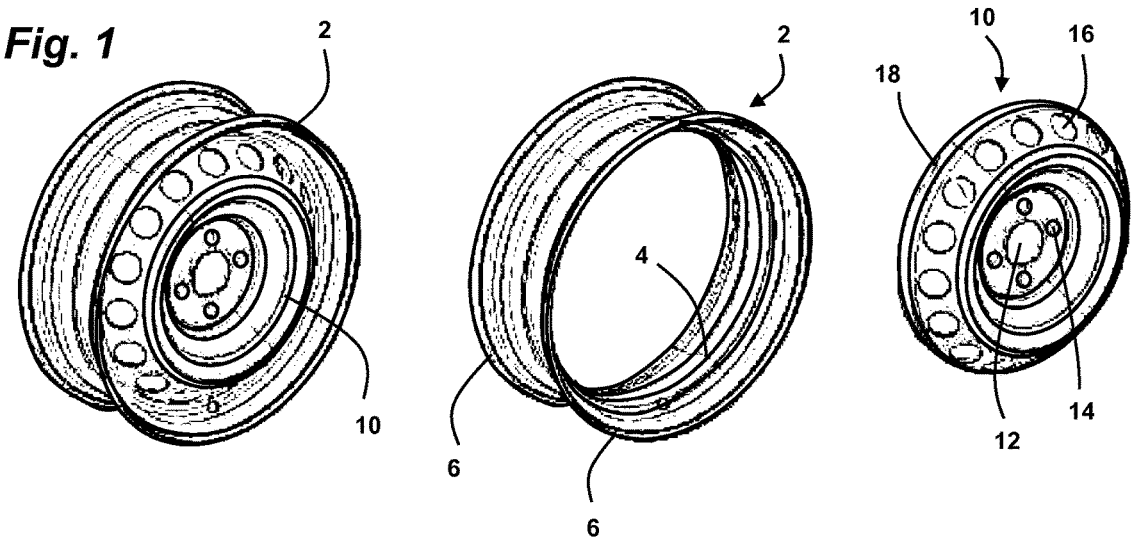
FIG. 1 shows successively a wheel assembled, then the detail of the rim and disc of this wheel.

FIG. 1 shows a wheel comprising a rim 2 formed from an aluminum sheet, having a circular profile comprising two lateral edges 6 intended to frame a tire. The rim 2 has, between the two edges 6, a rim base 4 forming the cylindrical part having the smallest diameter.

A disc 10 formed from a steel sheet has a central locating hole 12 surrounded by four holes 14 intended to receive studs for fixing the wheel onto the vehicle's hub.

Towards the outside, the disc 10 has a series of weight-reducing holes 16, then the sheet has an external perimeter 18 forming a cylindrical part facing towards the vehicle, intended to fit by clamping into the rim base 4 of the rim 2 in order to center this rim.

Figure 2:
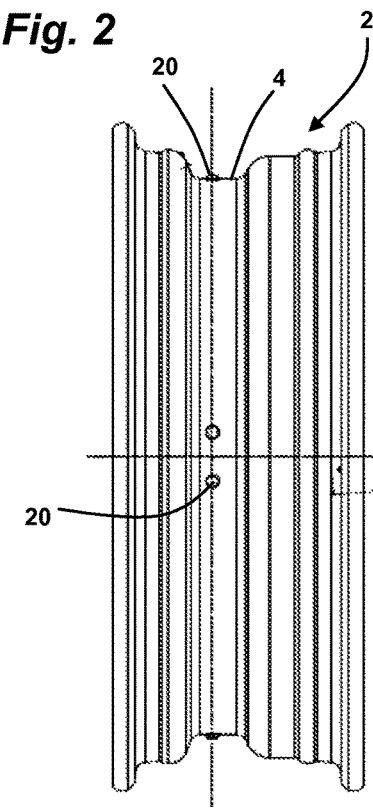
FIGS. 2 and 3 show side and front views, respectively, of the wheel.
Figure 3:
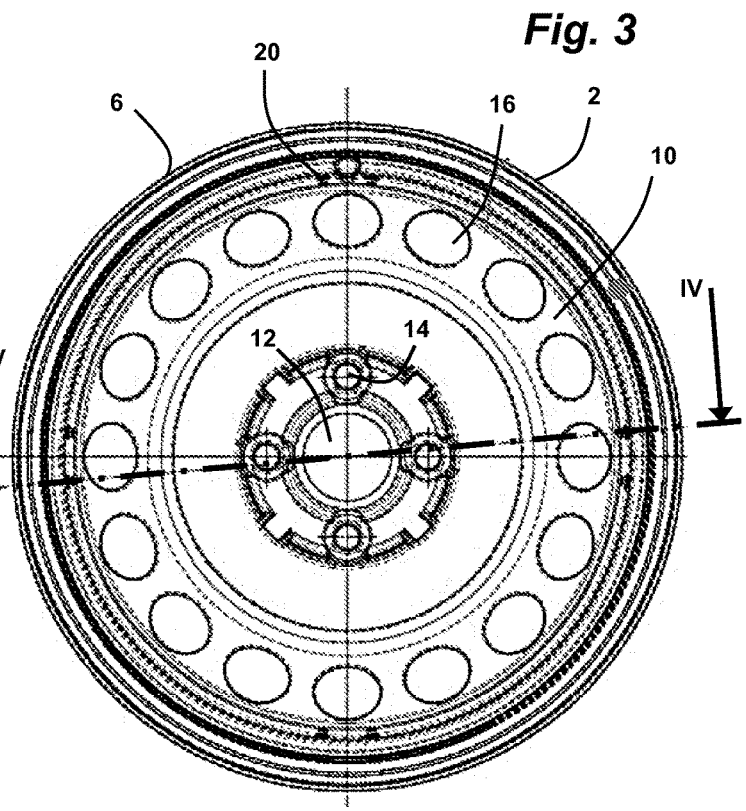
Figure 4:
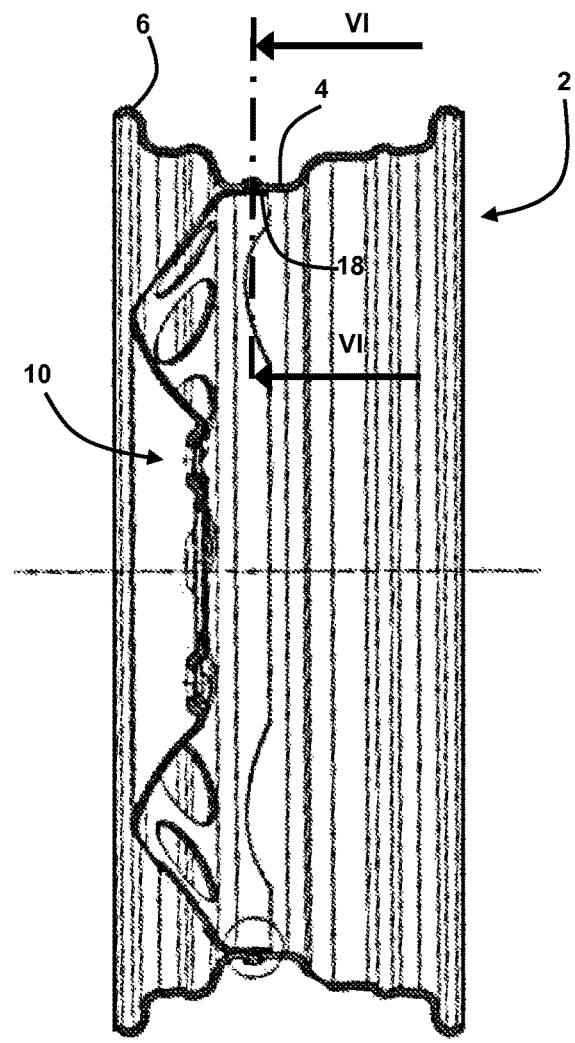
FIG. 4 shows a cross-sectional view of this wheel taken along line IV-IV of FIG. 3.

FIGS. 2, 3 and 4 show the disc 10 held fixed in the rim 2 by four assemblies comprising a pair of pins 20, evenly distributed round the wheel in the same transverse plane, each comprising two pins arranged closely together.

Figure 5:
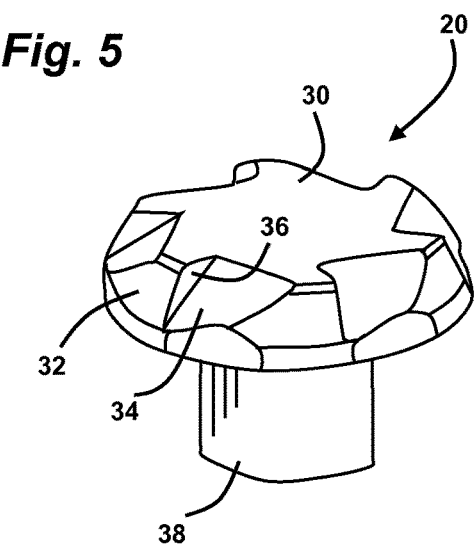
FIG. 5 shows an assembly pin of this wheel.

FIG. 5 shows in detail a steel pin 20 comprising a tip 38 terminating below in a domed shape and a head 30, the flat top of which has around its perimeter a tapered chamfer 32.

The perimeter of the pin head 30 comprises six indentations 34 each forming a downward inclined facet, which terminates in the clockwise direction of rotation in a perpendicular face 36 arranged in an axial plane. In this way, a tool having a shape corresponding to the indentations 34 can drive the pin 20 in rotation in a clockwise direction, with reference to FIG. 5, by bearing on the perpendicular faces 36.

Conversely, a rotation of the tool in the opposite direction does not drive the pin 20. In this way, an arrival of the tool on the head of the pin 30 and a start of rotation easily positions the notches of this tool in the indentations 34.

Figure 6:
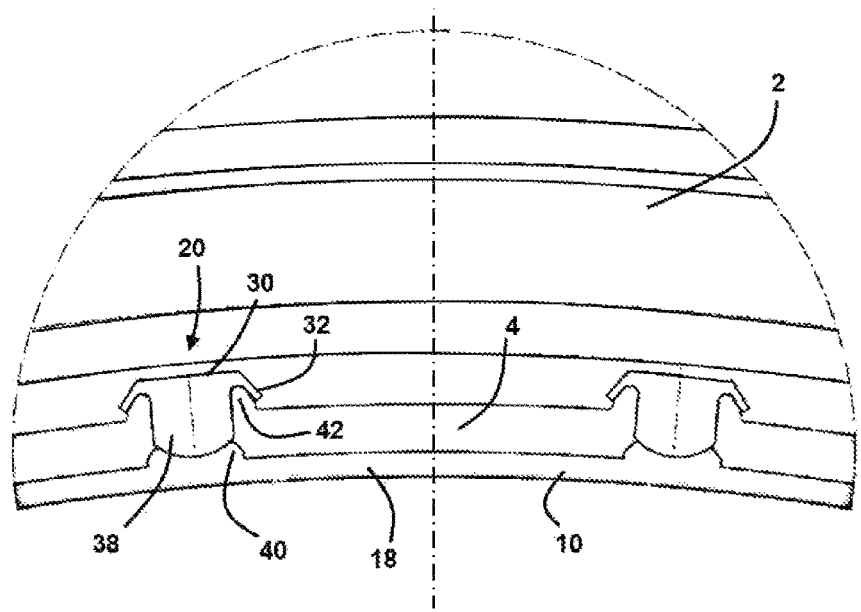
FIG. 6 is a detailed sectional view of the assembly of this wheel taken along line VI-VI of FIG. 4.

FIG. 6 shows a pair of pins 20 each comprising a tip 38 that passes through the aluminum sheet of the rim base 4, the end of the tip being fitted into and welded in a corresponding hollow formed in a boss 40 of the disc perimeter 18.

The pin head 30 constitutes a collar bearing on a circular beading 42 formed above the rim base 4, which surrounds the tip 38 of the pin 20, and fits into an annular hollow formed beneath this head.

The pin 20 is installed as follows. In a first step with a press encompassing the two superimposed sheets of the rim base 4 and the disc perimeter 18, a strong pressure is applied on the pin 20 and, using the cut-outs 34, the pin is rotated, so as to pierce with its tip 30 the aluminum alloy sheet of the rim base 4. This piercing causes an upward displacement of the material of the rim base 4, forming the circular beading 42 around the tip 38 of the pin.

In a second step, a rotation of the pin 20 applies a pressure of the end of the tip 38 on the perimeter 18 of the steel disc 10 in order to clean and activate these two contacting surfaces.

In a third step, the rotation of the pin 20 continues, causing a plastic deformation of the perimeter 18 of the steel disc, which forms a corresponding hollow at the domed end of the tip 38 of this pin and around the boss 40 by displacement of material.

In a fourth step the pin 20 is rotated at a high pressure so as to achieve considerable heating of the end of the pin and of the perimeter 18 of the steel disc at the point of contact to thereby form a weld joint between these elements (i.e., between the pin and the steel disc). At the same time, the final descent of the pin 20 causes a shaping of the circular bead 42 of the rim base 4, the bead 42 fitting into the annular hollow in the head 30 of this pin.

In this way, an effective clamping of the rim base 4 on the sheet of the perimeter 18 of the steel disc is achieved by the axial clamping of the pin head 30 on the circular beading 42 of the rim 2.

It will be noted that this fixing method is simple and quick to implement, does not require prior pilot drilling of the rim 2 or prior- or post-treatment of the sheets after this operation. In practice, each pin placement is performed in a single operation, by a press comprising a cycle of pressures and speeds of rotation automatically performing the different steps of the method. A safe fixing necessary for wheels is thus achieved in an economic way.

For a 16-inch wheel with an aluminum alloy rim, a saving of around 1.3 kg per wheel is achieved, which equates to 5.2 kg for the entire vehicle. This reduction in vehicle weight contributes to a reduction in fuel consumption and emissions of polluting gases.

With this same method it is possible to assemble sheets of different thicknesses. In particular, for a small-diameter wheel, a minimum of three pins 20 arranged in a triangle can be fitted in order to ensure the connection between the disc and the rim.

The invention claimed is:

1. A wheel intended for a motor vehicle, the wheel comprising a rim made of an aluminum alloy sheet, a disc made of a steel sheet sized to be received within the rim, and pins connecting the rim to the disc, the pins comprising a head and a tip extending from said head wherein the rim defines holes through which said tips of said pins pass to engage said disc, a front end of the tip being welded to the disc, and the head of the pin engaging the rim around the hole on a surface of the rim opposite the disc.

2. The wheel according to claim 1, wherein the head of each pin defines a contoured perimeter shaped to enable the pin to be driven in rotation.

3. The wheel according to claim 2, wherein the contoured perimeter of the pin head is shaped such that the pin can be driven by a tool in only one direction of rotation.

4. The wheel according to claim 1, wherein the end of each pin tip is domed.

5. The wheel according to claim 1, wherein the rim forms a circular bead around the pin tip, the circular bead protruding above the rim.

6. The wheel according to claim 5, wherein the pin head defines an annular hollow on an underside of the pin head into which the circular beading fits.

7. The wheel according to claim 1, wherein the wheel comprises pin assemblies, each pin assembly comprising a pair of pins positioned proximate each other, the pin assemblies being distributed evenly around the perimeter of the wheel.

8. The wheel according to claim 1, wherein the rim defines a cylindrical rim base, the rim base defining a smallest diameter of the rim.

9. A method for manufacturing a wheel for a motor vehicle, the wheel comprising a rim made of an aluminum alloy sheet fixed to a perimeter of a disc made of a steel sheet by connecting pins, wherein, with a cycle comprising different pressures and speeds of rotation of a steel pin, the method comprising:
- a first step of pressing a front tip of the pin into the aluminum rim in order to pierce the aluminum rim,
- a subsequent step, pressing the front tip of the pin into the steel disc in order to cause a plastic deformation of the steel disc adapting to the shape of the end of the tip, and
- in a subsequent step friction-welding the tip of the pin to the steel sheet of the disc.

10. A motor vehicle comprising wheels of claim 1.

* * * * *